United States Patent [19]

Horton

[11] Patent Number: 4,549,567

[45] Date of Patent: Oct. 29, 1985

[54] FLUID DISTRIBUTOR

[76] Inventor: Donelson B. Horton, Rte. 1, Box 119, Madison, Ala. 35758

[21] Appl. No.: 535,642

[22] Filed: Sep. 26, 1983

[51] Int. Cl.⁴ ............................................. E03B 11/00
[52] U.S. Cl. ................................ 137/262; 137/561 A; 73/863.45
[58] Field of Search .................. 137/255, 262, 624.14, 137/561 R, 561 A; 73/863.45, 863.41

[56] References Cited

U.S. PATENT DOCUMENTS

| | | | |
|---|---|---|---|
| 608,834 | 8/1898 | Byrnes | 73/863.45 |
| 1,208,373 | 12/1916 | Rhodes | 137/262 |
| 2,584,960 | 2/1952 | Beardsell et al. | 137/262 |
| 2,678,845 | 5/1954 | Fitter | 137/624.14 |
| 3,045,493 | 7/1962 | Seaborne | 73/863.45 |
| 3,249,116 | 5/1966 | Hudson | 137/262 |
| 3,423,913 | 1/1969 | Mecklin | 137/262 |

Primary Examiner—Alan Cohan
Assistant Examiner—John A. Rivell
Attorney, Agent, or Firm—C. A. Phillips; Michael L. Hoelter

[57] ABSTRACT

A fluid distributor in which a rotor having a distributing passageway is positioned above pie-shaped exit compartments in a tubular housing. The passageway extends from a central opening in the housing downward and with a circumferential cant to just above the compartmented exits, whereby a fluid input produces a rotation of the rotor, and as it rotates, the fluid is sequentially fed to and discharged through the compartmented exits.

9 Claims, 5 Drawing Figures

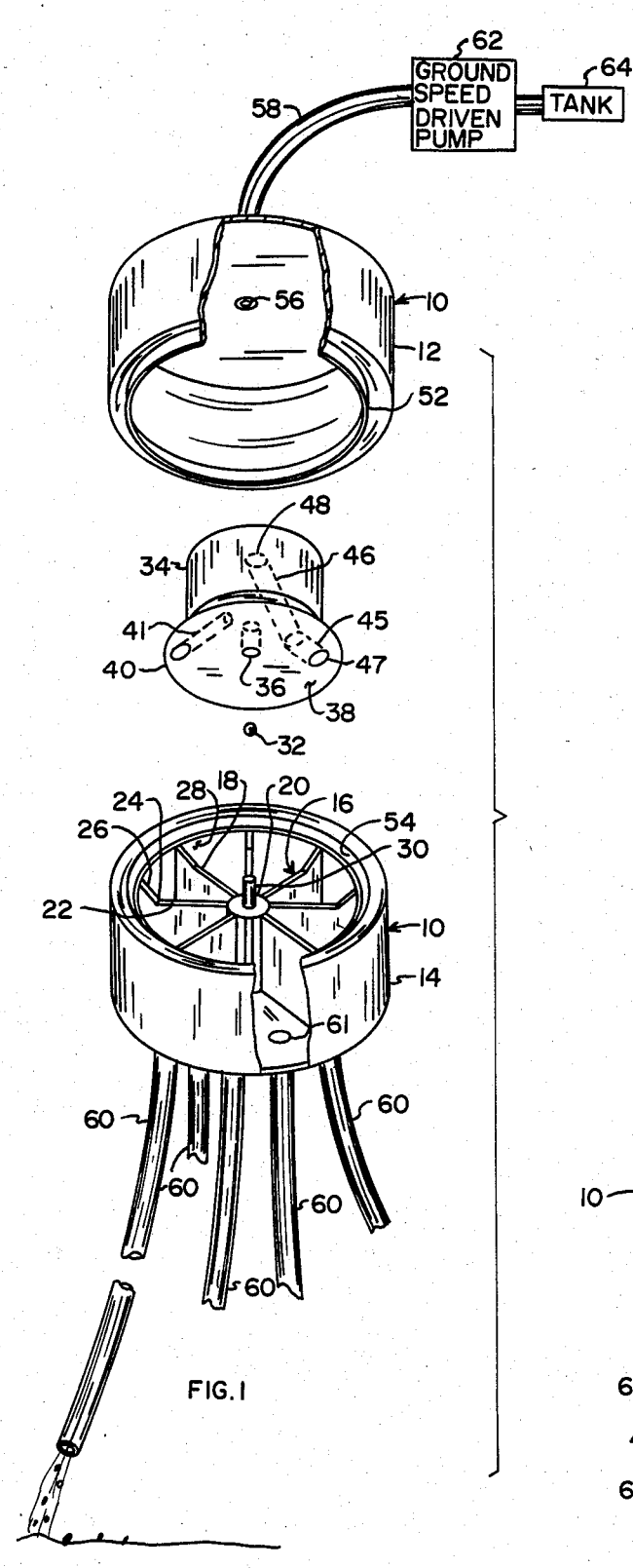
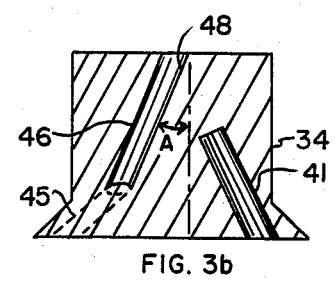
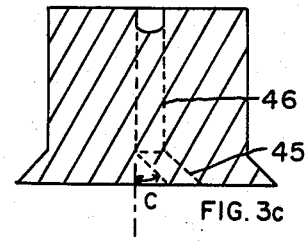
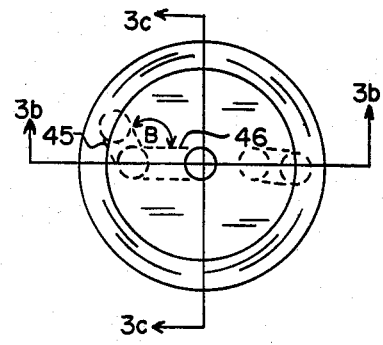
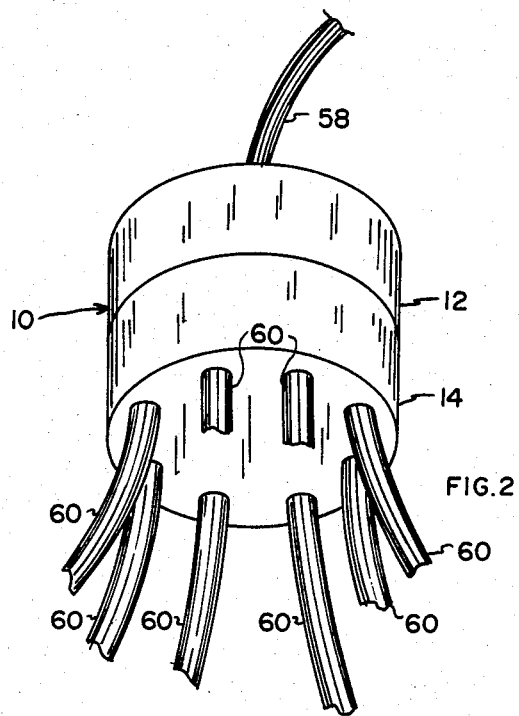

FLUID DISTRIBUTOR

FIELD OF THE INVENTION

This invention relates generally to devices and systems for the distribution of a fluid from a central source to a plurality of locations, and particularly to a fluid distributor capable of distributing fluids which are not readily flowable, often referred to as dirty fluids.

BACKGROUND OF THE INVENTION

There are many instances where it is desirable to evenly divide flow from a single fluid line to and between a plurality of fluid lines, which will be referred to as distribution lines. Where the fluid is relatively clean and one not significantly viscous, one can employ flow impedance in each of the distribution lines. However, where the fluid is significantly viscous or contains a large proportion of particles, more or less in suspension, as with certain fertilizers, clogging will most certainly occur. Of the systems known to the applicant, the most pertinent will be described here.

Perhaps the earliest system is illustrated in U.S. Pat. No. 791,425 wherein inlet flow enters the center of a tubular distributor and is directed onto a centrally positioned cone and then into compartments positioned circumferentially around the cone. Each compartment contains an outlet to a distribution line. The problem with this arrangement is that variations in the constituency of the fluid often produce unevennesses in distribution, and the tolerances required to evenly divide a stream of, say, $\frac{1}{4}''$ in diameter, are difficult to maintain. Also, the effect of wear on the cone and orifice shortens the life of the system.

A second and somewhat related system substitutes in place of a conical receiver a nozzle which forms a conical shape flow. A basic problem with this is that nozzles do not have a uniform pattern at all pressures, and second, operation is restricted to employment with a rather limited range of inlet fluid pressures, for example, from about 20 to 40 PSI to obtain even a reasonable pattern. The significance of this limitation is that the volume of fluid distributed is a direct function of the square root of pressure. Since often, particularly in the case of fertilizer, the necessary or desired rates of application may vary beyond such a range, this limitation creates quite a problem. Additionally, the effect of wear on the nozzle is quite pronounced and flow patterns change rapidly.

In a third system, a pressurized fluid is directly distributed between a plurality of output lines, and in each line there is a flow regulator or impedance as referred to above. In this case, the flow impedance is distributed in each line, being in the form of a number of serially arranged orifices. Theoretically, if each of these orifices is alike, there will be an even flow out of each. Unfortunately, to obtain practical ranges of flow with "dirty" materials, the diameter of the orifices must be so small that clogging occurs. It is not practical to strain out these particles since they contain plant nutrients.

A fourth and somewhat related system employs one or two serially arranged orifices as impedances in output lines, and in recognition of a critical pressure situation with this system, a sight glass indicator of pressure is employed. This sight glass is several feet height, and typically there are several distributors and an operator must watch several of these sight glasses in order to properly maintain operation. This is frequently quite difficult, particularly since the operator is often engaged in driving a tractor at the same time. A further difficulty with this system is, as in the case of the third system, that it involves orifice restrictions to develop uniform impedance and plugging or partial plugging of orifices often interferes with uniformity.

It is the purpose of the applicant's invention to overcome the aforesaid and other difficulties and to provide an improved fluid distributor which will work well with either clear fluids or fluids containing suspended matter, one that does not require close operator supervision, and one that does not involve small restrictive nozzles. Further, and quite significant, the applicant's system is capable of operating over a wide pressure range, enabling a much greater range of flow rates.

SUMMARY OF THE INVENTION

In accordance with this invention, a distributor for fluids is constructed within a housing having a circular or tubular side wall with an input line, or inlet, entering the center of a top end of the housing and a plurality of exit lines attached in a circumferential pattern to the opposite or bottom end of the housing. Radially extending walls in a lower portion of the housing form pie-shaped, volume dividing sectors or compartments, each being positioned around an exit to one of the exit lines. A rotor is pivotally mounted above the compartments, it containing a fluid passageway with an upper entrance opposite to the inlet. This passageway extends downward, outward, and circumferentially and has a bottom exit. By this configuration, flow produces rotation of the rotor, and as it rotates, flow is sequentially and evenly distributed to the compartments and therefrom out the exits to the exit lines.

BRIEF DESCRIPTION OF THE DRAWINGS

FIG. 1 is an exploded pictorial view of an embodiment of the invention.

FIG. 2 is a pictorial view of an embodiment of the invention as it would normally appear.

FIGS. 3a–3c are diagrams illustrating the orientation of a passageway through a component of the embodiment.

DETAILED DESCRIPTION OF THE DRAWINGS

Referring to the drawings, a housing 10 is generally formed of two tubular enclosures, a top enclosure 12 and a bottom enclosure 14. The end walls of the enclosures are generally spaced 3 to 7 inches from each other. A partition assembly 16 is formed by a plurality of partition walls 18 attached to and extending outward from a central spool or core 20 within bottom enclosure 14. Typically, the interior of housing 10 would be approximately 4 to 6 inches in diameter, and, accordingly, the overall diameter of the partition would be the same. As will be noted, the top edges of the partition walls are formed by a generally flat central edge portion 22 (1 to 3 inches in height), which terminates at a point 24, approximately $1\frac{1}{2}$ inches from the center of the assembly; and from this point outward, an outer edge region 26 extends upward to a point of termination on interior wall 28 approximately 1 inch higher than the central edge portion 22.

The inner sides of partition walls 18 terminate at and are supported by a central core 20 which is supported on the bottom of bottom enclosure 14. A shaft 30 extends upward from core 20 and rotably supports, via a ball 32, distribution rotor 34. Shaft 30 and ball 32 extend into a cylindrical opening 36 in rotor 34 which is sized to provide a generally stable and aligned rotation. The bottom side 38 of rotor 34 just clears central edge portion 22 of the partition walls, and its outer edge 40 just clears the outer abutting edge region 26 of compartment walls 18. Rotor 34 is formed with a passageway 46 which commences at a center, top, opening 48 of the top of rotor 34 and extends downward and radially outward at an angle A (FIG. 3b) of approximately 15° to 60° (with respect to the vertical) for a vertical distance of approximately 1 to 3 inches. At this point, a section 45 of passageway 46 extends further downward and outwardly but also with a circumferential component of direction. It has a vertical component of from $\frac{1}{2}$ to $1\frac{1}{2}$ inches, extending with a horizontal angular component B of 70° to 110° as shown in FIG. 3a, and a vertical angular component of 15° to 60° as shown by angle C in FIG. 3c. A second partial passageway 41 is located generally opposite to passageway 46 and acts to balance rotor 34 as it is rotated.

With rotor 34 in place and resting on shaft 30, top enclosure 12 would fit over it, and it has a locking rim 52 which fits down within a mating slot 54 in bottom enclosure 14. When in such position, the top opening 48 in passageway 46 is aligned with inlet orifice 56 in top enclosure 12 which is connected with an inlet tube 58 attached to this opening.

Typically, tube 58 would have an inner diameter of $\frac{3}{8}$ to 1 inch, inlet 56 would have a diameter of from $\frac{1}{8}$ to $\frac{1}{2}$ inch, and passageway 46 would have an inner diameter of from $\frac{1}{2}$ to $\frac{3}{4}$ inch. Distribution tubes 60, attached by means not shown to the underside of bottom enclosure 14, would typically have an inner diameter of approximately $\frac{1}{2}$ to 1 inch and would typically extend outward to positions on a distribution unit such as a field cultivator for spaced dispensing of fluid. Significantly, the exit openings 61 (only one being shown) and distribution tubes 60 are sized to prevent any significant impedance to flow. As an example, the cross-sectional area of the exit tubes would be 400% to 1,000% of the cross-sectional area of inlet orifice 56. As indicated above, the distributor fluid may be a relatively "dirty" fluid or one which has in it substantial granular matter. While, as noted, there are 8 compartmented regions, this number may be from 4 to 20.

In operation, typically a pump 62, whose output or pressure varies in accordance with ground speed, would provide a pressurized fluid from tank 64 at a selected pressure to inlet orifice 56, the fluid flows downward through orifice 56 ($\frac{1}{8}$ to $\frac{1}{2}$ inch in diameter), then downward through passageway 46 of rotor 34. As it exits, due to the exiting direction of fluid along a line which has a reaction component along a tangent to the turning circle of exit opening 47, a rotational force is imparted to the rotor. As rotor 34 rotates, the fluid is dispensed to each of the compartments sequentially and is thereby distributed through distribution lines 60 typically positioned with unrestricted openings at a selected ground spacing for the distribution onto the ground, illustrated in FIG. 1. As there is no restriction to flow, such as impedance creating orifices, there is little to disrupt even flow. Likewise, because of the lack of restrictions, it has been found possible to achieve a quite substantial range of rates of flow inasmuch as the system is quite pressure tolerant, working well in pressures, from pump 62, in the range of from 5 to 60 PSI. In consideration of the square root relation mentioned above, this enables a variation in flow rates of approximately $3\frac{1}{2}$:1. This is in contrast to the range of permissible flow rates with existing equipment of approximately 1.4 to 1, clearly a major improvement.

While the embodiment of the invention described has been fairly particularly dimensioned and described in terms of discrete shapes, it is to be appreciated that the diameter and height of tubular housing 10 may be varied without materially changing the function of the unit, and similarly, the number of compartments and thus distributing outlets may be varied, particularly enlarged with the enlargement of the diameter of housing 10. Further, it is to be appreciated that rotor 34 may be varied to an extent in its construction and size, it being important that it not provide a significant restriction in flow and that there be a cant in the exit region of passageway 46 sufficient to provide a rotational force to the rotor sufficient to overcome frictional effects on it. As to construction materials, typically the housing and compartments would be constructed of plastic or other non-corrosive material as would be rotor 34. The wall thickness of top and bottom enclosures 12 and 14 and the wall thicknesses of compartmented walls are not critical, with a typical wall thickness for the enclosures of approximately $\frac{1}{4}$ inch and thickness of compartment walls of approximately $\frac{1}{8}$ inch.

From the foregoing, it is to be appreciated that the applicant has provided a clearly new and improved fluid distributor which overcomes the disabilities described above with respect to prior art devices, and at the same time provides improved performance, particularly in enabling a greater range of flow rates with a single sized unit.

I claim:

1. A fluid distributor comprising:
   a fluid housing comprising:
      a tubular inner side wall region,
      a top wall enclosing the top of said fluid housing and having an inlet opening concentric with said tubular side wall region, and
      a bottom wall having a plurality of circumferentially spaced exit openings, said openings being in the radially measured outer peripheral region of said bottom;
   a plurality of walls extending radially outward from the center of said housing to said side wall and forming with said tubular side wall a plurality of discrete compartments in a lower region of said housing, each said compartment being formed over one of said exit openings;
   rotary coupling means for coupling fluid from said inlet opening sequentially into said compartments including a rotor rotatably supported by said housing above said compartments, said rotor generally closing over said compartments and including a passageway having an entrance positioned adjacent to and adapted to receive fluid from said inlet opening and having a lower exit opening radially positioned between a tubular center of said housing and said tubular side wall above an outer region of said compartments, and said passageway having an exit end region extending along a line which has a directional component downward and a directional component tangential with a circle through which said exit opening would traverse by the rotational of said rotor and by which flow is directed in an off-normal path with respect to said side wall region; and wherein said exit openings have a cross section of no less than 400% of the cross section of said inlet opening;

whereby, upon there being supplied a fluid material through said inlet opening, the fluid would pass through said passageway, and upon exiting, would create a reaction which would rotate said rotor, and thereby fluid would be sequentially distributed to said compartments and exit unrestricted through said exit openings in said fluid housing.

2. A fluid distributor as set forth in claim 1 wherein said passageway of said rotor includes an entrance end region coupled to said exit end region and said entrance end region extends down and outward at an angle A of from 15° to 60°, and said exit end extends with an angular component B measured in a horizontal plane of from 70° to 110° from a radial, and a vertical angular component of 15° to 60°.

3. A fluid distributor as set forth in claim 2 wherein said rotor has a lower edge region which generally terminates at a circular edge and a side wall portion of said rotor tapers downward and outward to said edge, and top edge regions of said dimensioned walls forming said compartments are centrally recessed and said lower edge region of said rotor rotates within the recess thus formed, minimizing frictional effects on said rotor.

4. A fluid distributor as set forth in claim 3 wherein said rotor has a central, circular, mounting cavity extending inward from the bottom of the rotor, and a central shaft supported by said housing extends upward into said mounting cavity.

5. A fluid distributor as set forth in claim 4 including a ball within said mounting cavity in said rotor and supporting said rotor on said shaft.

6. A fluid distributor as set forth in claim 1 wherein said tubular side wall is of a diameter of from 4 to 6 inches, and the spacing between said top and bottom wall is between 3 and 7 inches.

7. A fluid distributor as set forth in claim 1 wherein said inlet opening is circular and has a diameter of from $\frac{1}{4}$ to $\frac{1}{2}$ inch, and each said exit opening is of a diameter of from $\frac{1}{2}$ to 1 inch.

8. A fluid distributor as set forth in claim 1 further including a source of fluid pressure of from 5 to 60 PSI coupled to said inlet opening.

9. A fluid distributor as set forth in claim 1 wherein there are from 4 to 20 said compartments.

* * * * *